US011773355B2

United States Patent
Halter

(10) Patent No.: US 11,773,355 B2
(45) Date of Patent: Oct. 3, 2023

(54) DIRECT TRANSFER OF FERMENTATION CARBON DIOXIDE BY-PRODUCT TO GREENHOUSE

(71) Applicant: Mathew Halter, Knoxville, TN (US)

(72) Inventor: Mathew Halter, Knoxville, TN (US)

( * ) Notice: Subject to any disclaimer, the term of this patent is extended or adjusted under 35 U.S.C. 154(b) by 360 days.

(21) Appl. No.: 16/828,793

(22) Filed: Mar. 24, 2020

(65) Prior Publication Data
US 2020/0332235 A1 Oct. 22, 2020

Related U.S. Application Data

(60) Provisional application No. 62/835,657, filed on Apr. 18, 2019.

(51) Int. Cl.
 C12F 3/02 (2006.01)
 A01G 9/18 (2006.01)
 B01D 53/62 (2006.01)

(52) U.S. Cl.
 CPC .............. *C12F 3/02* (2013.01); *A01G 9/18* (2013.01); *B01D 53/62* (2013.01); *B01D 2257/504* (2013.01)

(58) Field of Classification Search
 CPC . A01G 9/246; A01G 9/24; A01G 7/02; A01G 9/18; C12F 3/02
 See application file for complete search history.

(56) References Cited

U.S. PATENT DOCUMENTS 4,003,160 A * 1/1977 Muller .................. A01G 7/02
 435/255.2
4,699,642 A 10/1987 Perry et al.
 (Continued)

FOREIGN PATENT DOCUMENTS

CN 1308036 A 8/2001
CN 1526812 A 9/2004
 (Continued)

OTHER PUBLICATIONS

WO2019215275A1 translation (Year: 2019).*
 (Continued)

*Primary Examiner* — Monica L Perry
(74) *Attorney, Agent, or Firm* — Merchant & Gould P.C.

(57) ABSTRACT

A system and method for directly transferring fermentation carbon dioxide by-product to a greenhouse are disclosed. A three-way valve receives the carbon dioxide by-product from fermentation vessels in a fermentation facility, and either directs the carbon dioxide by-product to a proximately located greenhouse or diverts the carbon dioxide by-product to the external environment based on greenhouse carbon dioxide concentration levels that are monitored by sensors communicatively coupled to the valve. For example, if the concentration levels are below a threshold, the sensors may transmit a signal to the valve to direct the carbon dioxide by-product to the greenhouse; otherwise, if the concentration levels are at or above the threshold, the carbon dioxide by-product may be diverted to the external environment. The threshold may be a carbon dioxide concentration level determined to be optimal for photosynthetic efficiencies based on a number and/or type of the plants contained within the greenhouse.

10 Claims, 8 Drawing Sheets

(56) References Cited

U.S. PATENT DOCUMENTS

| | | | | |
|---|---|---|---|---|
| 5,682,709 | A | * | 11/1997 | Erickson ............... A01G 7/02 47/1.4 |
| 6,237,284 | B1 | | 5/2001 | Erickson |
| 6,725,598 | B2 | | 4/2004 | Yoneda et al. |
| 10,898,846 | B1 | * | 1/2021 | Kolodji ............... B01D 53/84 |
| 2011/0153053 | A1 | | 6/2011 | Kim et al. |
| 2016/0003532 | A1 | | 1/2016 | Young et al. |
| 2016/0057943 | A1 | * | 3/2016 | Im ............... A01G 9/18 47/17 |
| 2018/0116131 | A1 | | 5/2018 | Leo |
| 2018/0343806 | A1 | * | 12/2018 | Leo ............... A01G 24/30 |
| 2018/0359942 | A1 | * | 12/2018 | Millar ............... A01G 31/042 |
| 2019/0037792 | A1 | * | 2/2019 | Leo ............... A01G 25/16 |
| 2021/0307269 | A1 | * | 10/2021 | Massey ............... A01G 31/047 |

FOREIGN PATENT DOCUMENTS

| | | |
|---|---|---|
| CN | 202406610 U | 9/2012 |
| CN | 105432341 A | 3/2016 |
| DE | 3523790 A1 | 1/1987 |
| GB | 2460495 A | 9/2009 |
| WO | 2010089144 A1 | 8/2010 |

OTHER PUBLICATIONS

WO2019215275A1 Original publication (Year: 2019).*

Steve Graham, "Harvest of Hops", https://www.thirstcolorado.com/source/highhopsnurseryandbrewery, Date: May 12, 2017, 4 Pages, Denver CO, USA.

Renee Basset, "Beer Brewing and Carbon Dioxide Recycling | Automation World", https://www.automationworld.com/beer-brewing-and-carbon-dioxide-recycling, Date: Mar. 25, 2013, 4 Pages, Chicago IL, USA.

Patrick Rue "Cellar Ventilation / Exhaust System", https://discussions.probrewer.com/showthread.php?25589 . . . Ventilation-Exhaust-Syste, ProBrewer.com discussion page, Date Jun. 2, 2012, 5 Pages, Orange County CA USA.

Chase Werner, "Managing Carbon Dioxide In Your Grow Space", https://fifthseasongardening.com/regulating-carbon-dioxide,Date: Feb. 25, 2014, 15 Pages, Asheville, NC, USA.

Honeywell, Carbon Dioxide (CO2) HVAC Basics, https://customer.honeywell.com/resources/Techlit/TechLitDocuments/63-0000s/63-7049.pdf, Resource document, 1998, 8 Pages, USA.

"Carbon Dioxide Monitoring Systems", www.ox-an.com/carbon_dioxide_monitoring_systems.asp, on-line catalog, Accessed in 2020, 3 Pages, Durham, UK, archived copy dated obtained from the WaybackMachine at web.archive.org, archived copy dated Apr. 13, 2019 obtained from the WaybackMachine at web.archive.org.

Dr. E.R. Myers, "CO2 Ventilation for the Growing Season—HTG Supply", https://www.htgsupply.com/informationcenter/resources/co2-ventilation-for-growing, HTG Supply Website, Accessed in 2020, 4 Pages, USA, archived copy dated May 14, 2016 obtained from the WaybackMachine at web.archive.org.

"CO2 Systems: Regulators, Controllers & Monitors", https://www.planetnatural.com/product-category/growing-indoors/grow-rooms/co2-systems/, Planet Natural website, Accessed in 2020, 12 Pages, USA, archived copy dated Dec. 25, 2018 obtained from the WaybackMachine at web.archive.org.

Roger H. Thayer "Hydrofarm—Carbon Dioxide Enrichment Methods", https://www.hydrofarm.com/resources/articles/co2_enrichment, Hydrofarm.com, Accessed in 2020, 6 Pages, USA, archived copy dated Mar. 30, 2015 obtained from the Wayback Machine at web.archive.org.

CO2 Meter News Selected CO2 Meters on Sale, http://hosted.verticalresponse.com/450864/ecb89b16b3/1644501438/7a10ec8432/, Accessed in 2020, 2 Pages, Ormond Beach, FL, USA, archived copy dated May 1, 2015 obtained from the WaybackMachine at web.archive.org.

Pentair, Haffmans CO2 Recovery, https://foodandbeverage.pentair.com/en/products/haffmans-co2-recovery, Website, Accessed in 2020, 4 Pages, Delavan, WI, USA, archived copy dated Mar. 26, 2018 obtained from the WaybackMachine at web.archive.org.

* cited by examiner

DIRECT TRANSFER OF FERMENTATION CARBON DIOXIDE BY-PRODUCT TO GREENHOUSE

CROSS-REFERENCE TO RELATED APPLICATION

This application claims the benefit of U.S. Provisional Application No. 62/835,657 filed Apr. 18, 2019, which is incorporated herein by reference in its entirety.

BACKGROUND

Carbon dioxide is a prominent greenhouse gas that is produced from many different industrial processes, including alcoholic fermentation. Carbon dioxide emitted from these processes can be reused in various ways across many industries, especially the food and beverage industries. For example, greenhouse plant and vegetable producers may desire carbon dioxide for use in carbon dioxide enrichment. Carbon dioxide enrichment is a process by which the ambient concentration of carbon dioxide in the greenhouse is elevated to maximize plant photosynthetic capacity, which in turn increases plant productivity and yield. Some greenhouse producers may purchase carbon dioxide from suppliers who capture or generate carbon dioxide for sale, while others may generate carbon dioxide in-house via combustion systems. However, the purchase of carbon dioxide and/or in-house production of carbon dioxide can be expensive and cumbersome. It is with respect to these and other general considerations that embodiments have been described.

SUMMARY

In accordance with the present disclosure, the above and other issues are addressed by the following:

In a first aspect, systems for directly transferring fermentation carbon dioxide by-product to a greenhouse are disclosed. An example system includes a tubing system comprising one or more tubing portions, a valve coupled to each of the one or more tubing portions, and a sensor communicatively coupled to the valve. A first tubing portion of the tubing system may be configured to receive a flow of carbon dioxide by-product from one or more fermentation vessels located in a fermentation facility. The valve may be configured to receive the flow of carbon dioxide by-product from the first tubing portion, and either direct the flow of the carbon dioxide by-product to a greenhouse via a second tubing portion of the tubing system or divert the flow of the carbon dioxide by-product to an external environment via a third tubing portion of the tubing system. The sensor may be configured to monitor a carbon dioxide concentration level within the greenhouse and transmit a signal to the valve for controlling the flow of the carbon dioxide by-product.

In a second aspect, methods for controlling transfer of fermentation carbon dioxide by-product to a greenhouse are disclosed. An example method includes monitoring a carbon dioxide concentration level in a greenhouse located proximate to a fermentation facility, and comparing the carbon dioxide concentration level to a predetermined threshold. The method further includes directing carbon dioxide by-product received from one or more fermentation vessels located in the fermentation facility to the greenhouse if the carbon dioxide concentration level in the greenhouse is below the predetermined threshold, and diverting the carbon dioxide by-product to an external environment if the carbon dioxide concentration level in the greenhouse is at or above the predetermined threshold.

In a third aspect, computing devices for controlling transfer of fermentation carbon dioxide by-product to a greenhouse are disclosed. An example computing device includes a processing unit and a memory coupled to the processing unit. The memory may store instructions that, when executed by the processing unit, cause the processing unit to monitor a carbon dioxide concentration level in a greenhouse located proximate to a fermentation facility, compare the carbon dioxide concentration level to a predetermined threshold, and either direct carbon dioxide by-product received from one or more fermentation vessels located in the fermentation facility to the greenhouse if the carbon dioxide concentration level in the greenhouse is below the predetermined threshold, or divert the carbon dioxide by-product to an external environment if the carbon dioxide concentration level in the greenhouse is at or above the predetermined threshold.

BRIEF DESCRIPTION OF THE DRAWINGS

Non-limiting and non-exhaustive examples are described with reference to the following figures.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present invention are directed to a system for directly transferring fermentation carbon dioxide by-product to a greenhouse, and a method to control the transfer thereof. An example system includes a three-way valve that receives the carbon dioxide by-product from fermentation vessels in a fermentation facility, and either directs the carbon dioxide by-product to a proximately located greenhouse or diverts the carbon dioxide by-product to the external environment based on a greenhouse carbon dioxide concentration level monitored by at least one sensor communicatively coupled to the valve. For example, if the concentration level is below a predetermined threshold, the sensor may send a signal to the valve causing the carbon dioxide by-product to be directed to the greenhouse; otherwise, if the concentration level is at or above the predetermined threshold, the carbon dioxide by-product may be diverted to the external environment. The predetermined threshold may be a carbon dioxide concentration level determined to be optimal for photosynthetic efficiencies based on a number and/or types of plants contained within the greenhouse.

Figure 1:
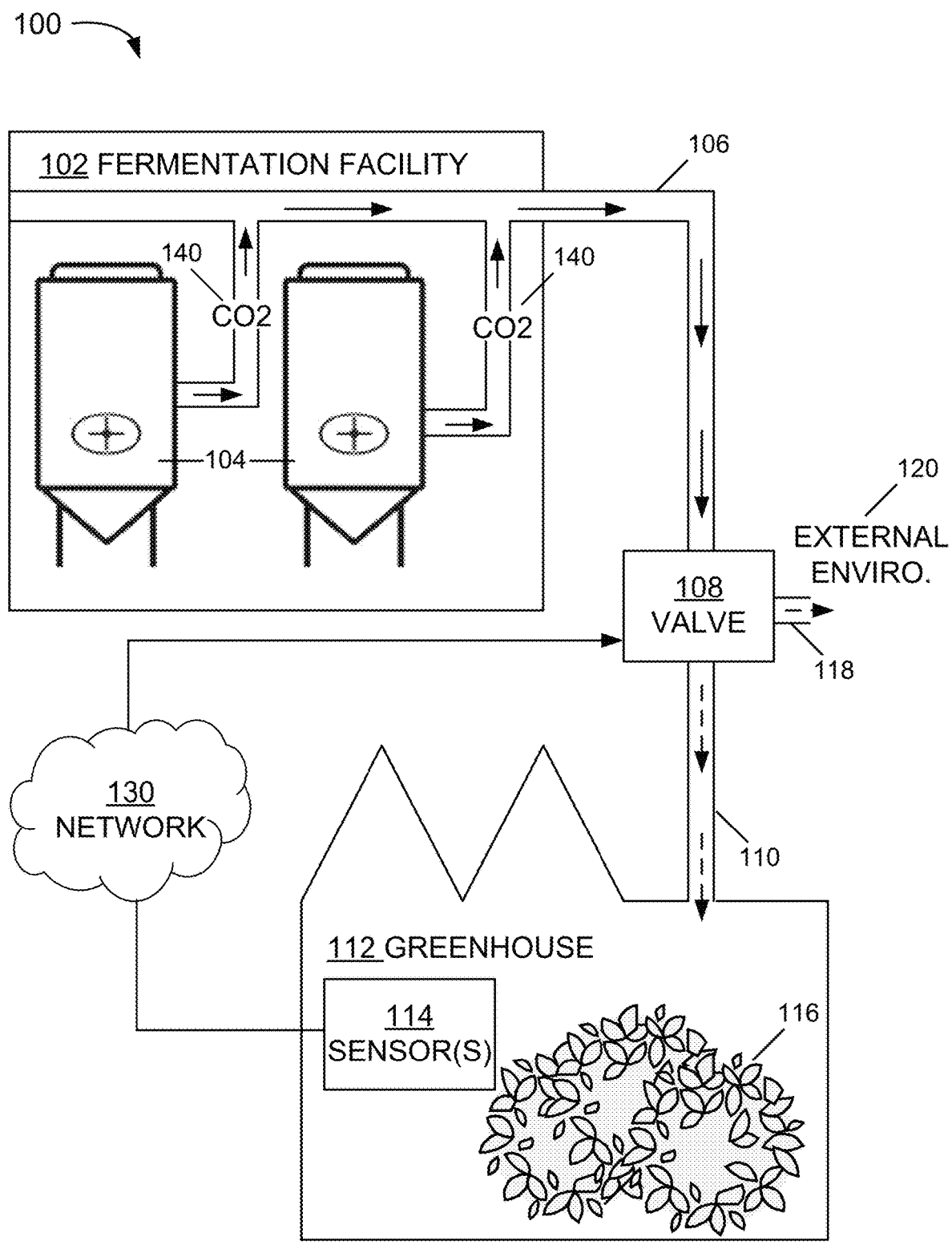
FIG. 1 illustrates an example environment where a system for directly transferring fermentation carbon dioxide by-product to a greenhouse may be implemented.

FIG. 1 illustrates an example network environment where a system 100 for directly transferring fermentation carbon dioxide by-product 140 to a greenhouse 112 may be implemented.

An example system 100 may include a fermentation facility 102 and a proximately located greenhouse 112 connected via a tubing system and a valve 108, where the tubing system may be comprised of at least a first tubing portion 106, a second tubing portion 110, and a third tubing portion 118. One or more components of the system 100 may be communicatively coupled over a wired or wireless network 130.

As discussed in greater detail in FIG. 2 below, the fermentation facility 102 may include one or more fermentation vessels 104 and at least partially house the first tubing portion 106. The fermentation vessels 104 may serve as a vessel in which fermentation occurs. In some examples, the fermentation may be ethanol fermentation, also known as alcoholic fermentation during which, a microorganism, such as yeast, converts sugars into ethanol and carbon dioxide. The carbon dioxide may be a by-product, hereinafter carbon dioxide by-product 140, that is released from the fermentation vessels 104. Some fermentation facilities may install carbon dioxide capture systems that enable collection of the carbon dioxide by-product 140 released. Depending on a type of fermentation facility, the collected carbon dioxide may be re-used to carbonate product, or the collected carbon dioxide by-product 140 may be packaged (e.g., into pressurized tanks), transported, and sold for other uses. Other fermentation facilities may simply allow the carbon dioxide by-product 140 to be released to an external environment, for example.

As discussed in greater detail in FIG. 3 below, the greenhouse 112 may include one or more sensors 114 and a variety of plants 116, and at least partially house the second tubing portion 110. The plants 116, via photosynthetic processes, convert carbon dioxide and water using light energy to glucose and oxygen. The glucose may be consumed or stored for later consumption by the plants 116 to drive metabolism and promote growth of the plants 116. Therefore, by increasing a concentration of carbon dioxide to optimal levels in the greenhouse 112, photosynthetic efficiencies may be improved generating greater amounts of glucose, which in turn results in higher quality and/or higher yielding plants.

Traditionally, to increase a concentration of carbon dioxide within greenhouses, tanks of pressurized carbon dioxide or other similar sources of carbon dioxide would be purchased from various suppliers. Some of the suppliers may include those fermentation facilities described above that install carbon dioxide capture systems to collect and package fermentation carbon dioxide by-product, and ship to the greenhouses. However, the costs of capturing and packaging carbon dioxide that are passed along to the greenhouses, as well as transportation costs to ship the carbon dioxide can become quite high, and economically impractical for greenhouses.

System 100 removes these re-capture, packaging, and transportation costs and inefficiencies by enabling direct transfer of the carbon dioxide by-product 140 from the fermentation facility 102 to the greenhouse 112 to maintain an optimal carbon dioxide concentration level within the greenhouse 112. As discussed in greater detail in FIGS. 4-6 below, the valve 108 may be connected to each tubing portion and/or otherwise integrated into the tubing system to control a directional flow of the carbon dioxide by-product 140 received from the fermentation vessels 104 via the first tubing portion 106 to either the greenhouse 112 via the second tubing portion 110 or an external environment 120 via the third tubing portion 118. The valve 108 may control the directional flow of the carbon dioxide by-product 140 based on signals received from the sensors 114 over the network 130. For example, the sensors 114 may generate and send signals to the valve 108 based on carbon dioxide concentration levels being monitored by the sensors 114 in the greenhouse 112 such that the valve 108 directs the carbon dioxide by-product 140 to the greenhouse 112 when the concentration level is below an optimal level and diverts the carbon dioxide by-product 140 to the environment when the concentration level is at or above the optimal level.

Figure 4:
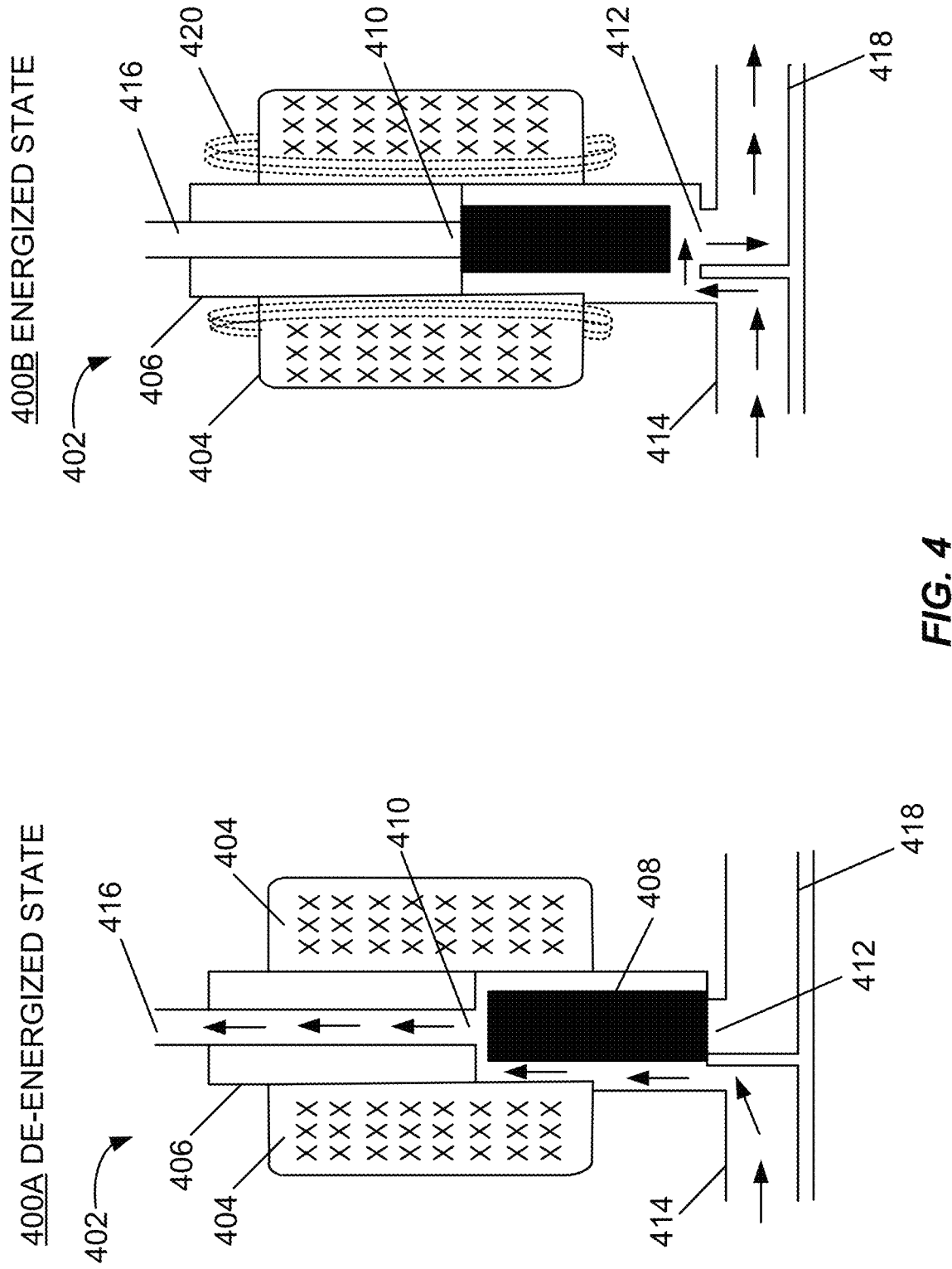
FIG. 4 illustrates example state configurations of a solenoid valve associated with a system for directly transferring fermentation carbon dioxide by-product to a greenhouse.

In some embodiments, the valve 108 may be a three-way solenoid valve, as described in detail in FIG. 4. In other embodiments, alternative types of valves and/or combinations of valves may be used to control the directional flow of the carbon dioxide by-product 140. The valve 108 may be located within the fermentation facility 102, the greenhouse 112, or external to either the fermentation facility 102 or the greenhouse 112.

The tubing system may be comprised of a plurality of tubes or pipes composed of one or more of plastic, glass, and metal. In some examples, the tubes or pipes may be composed of polyvinyl chloride, also known as PVC pipe. Each portion of the tubing system may be composed of a same material or a different material. A location of each tubing portion may be dependent on the location of the valve, as described in more detail in FIGS. 2 and 3 below. A circumference of the tubes or pipes within each tubing portion may be based on a desired flow rate of the carbon dioxide by-product and a rate at which the carbon dioxide by-product is being received from the fermentation vessels 104 and subsequently directed to the greenhouse 112 or diverted to the external environment 120. For example, in a fermentation facility with a lesser number of fermentation vessels, and where fermentation may be occurring only one to a few times a week, smaller sized tubing portions, as well as a smaller sized valve 108, may be used in comparison to a facility with a greater number of fermentation vessels, and where fermentation is occurring twenty-four hours a day, seven days a week.

Figure 2:
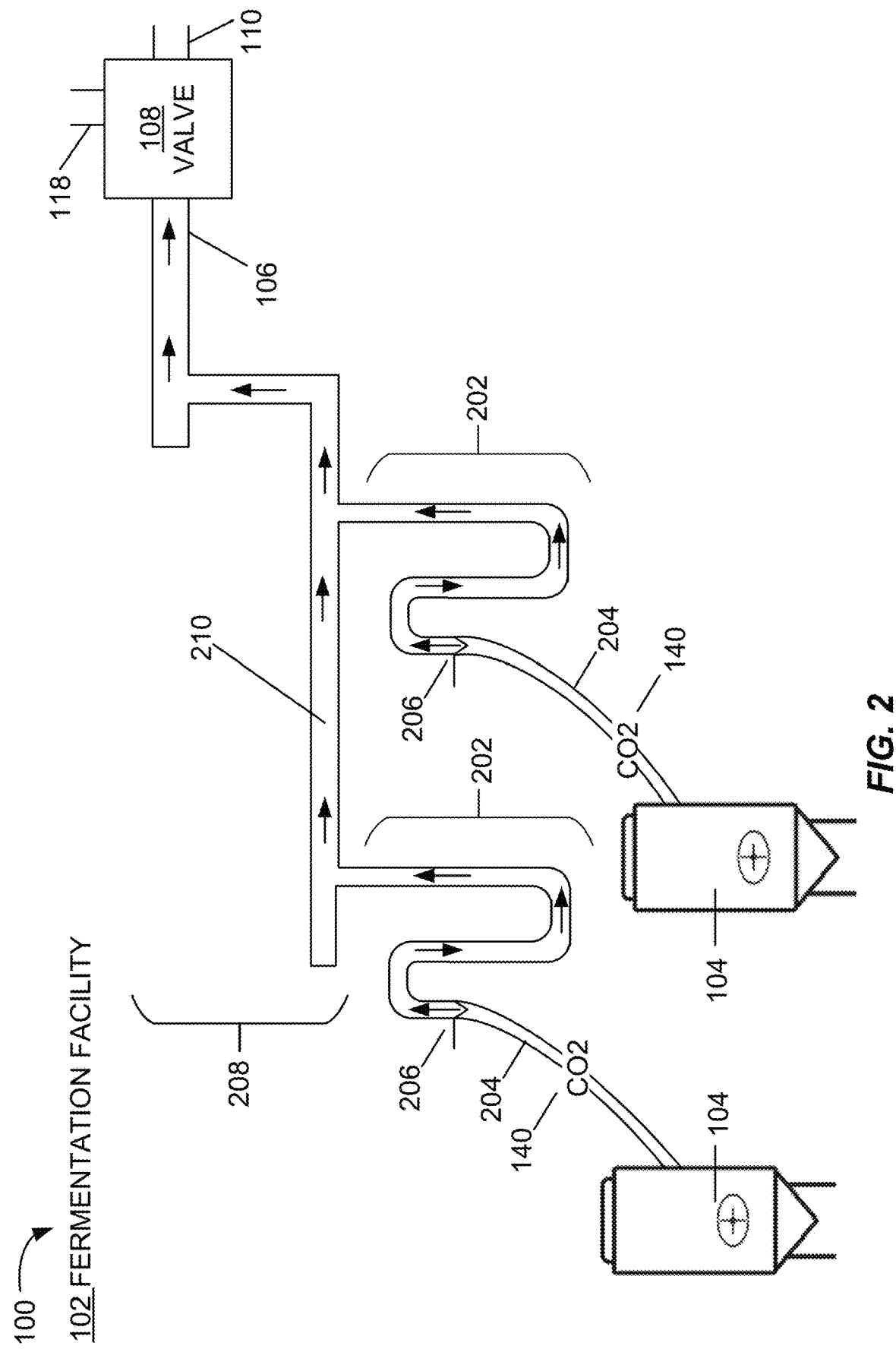
FIG. 2 illustrates an example fermentation facility associated with a system for directly transferring fermentation carbon dioxide by-product to a greenhouse.

FIG. 2 illustrates an example fermentation facility 102 associated with a system 100 for directly transferring fermentation carbon dioxide by-product 140 to a greenhouse 112. In some embodiments, the fermentation facility 102 is an alcohol production facility, such as a brewery, winery, and/or distillery producing beer, wine or spirits, for example. In other embodiments, the fermentation facility 102 is an industrial plant producing high-value industrial products.

The fermentation facility 102 may include one or more fermentation vessels 104. The fermentation vessels 104 may serve as a vessel in which fermentation occurs. In some examples, the fermentation may be ethanol fermentation, also known as alcoholic fermentation. During ethanol fermentation, a microorganism, such as yeast, converts sugars into ethanol and carbon dioxide, where the carbon dioxide is released as a by-product (i.e., carbon dioxide by-product 140). To provide examples, wine is produced by fermentation of the natural sugars present in grapes, whereas beer, whiskey, and vodka are produced by fermentation of starches that have been converted to sugar by an enzyme amylase.

An important structural component utilized in association with the fermentation vessels 104 is a fermentation airlock 202. Depending on a size and type of the fermentation vessels 104, the fermentation airlock 202 may be an integral component of the fermentation vessels 104, or as illustrated, tubing 204 may extend from an exhaust outlet of the fermentation vessels 104 to the fermentation airlock 202. The fermentation airlock 202 may prevent outside air from coming into the fermentation vessels 104 to avoid oxidation and reduce a risk of contamination, while also allowing the carbon dioxide by-product 140 to escape the fermentation vessels 104 to remove the risk of carbon dioxide build up causing the fermentation vessels 104 to rupture or fail. In some embodiments, the passage of the carbon dioxide by-product 140 from the fermentation vessels 104 through the fermentation airlock 202 may be controlled by a valve 206.

Some fermentation facilities may install carbon dioxide capture systems that enable collection of the carbon dioxide by-product 140 released from the fermentation airlock 202. Depending on a type of fermentation facility, the collected carbon dioxide may be re-used to carbonate product. For example, breweries may re-use collected carbon dioxide to carbonate the beer. In other examples, the collected carbon dioxide by-product 140 may be packaged (e.g., into pressurized tanks), transported, and sold for other uses. Other fermentation facilities may simply allow the carbon dioxide by-product 140 to be released from the fermentation airlock 202.

However, carbon dioxide by-product 140 released from the fermentation airlock 202 also poses a risk if it is simply released into an environment of the fermentation facility 102. For example, in high enough concentration levels, the carbon dioxide by-product 140 may pose a health hazard to employees of the fermentation facility 102. In some scenarios, the fermentation facility 102 may install an exhaust ventilation system to safely remove any potential hazards caused by the carbon dioxide by-product 140 being released. The exhaust ventilation system may be a general exhaust ventilation system or a local exhaust ventilation system. An example general exhaust ventilation system allows the carbon dioxide by-product 140 to be emitted into the air within the fermentation facility 102, and then dilutes the concentration of the carbon dioxide by-product 140 to an acceptable level. An example local exhaust ventilation system, such as illustrated exhaust ventilation system 208, captures the carbon dioxide by-product 140 at its source (e.g., directly from the fermentation airlock 202) to remove the carbon dioxide by-product 140 from the fermentation facility 102. For example, the exhaust ventilation system 208 may include a ventilation header 210 that receives the carbon dioxide by-product 140 released from the fermentation airlock 202.

In some fermentation facilities, the exhaust ventilation system may release the carbon dioxide by-product 140 to the external environment. However, in this example fermentation facility 102 of system 100, the ventilation header 210 and/or other components of the exhaust ventilation system 208 coupled to the ventilation header 210 may be an integral part of or directly connected to the first tubing portion 106 that delivers the carbon dioxide by-product 140 to the valve 108. In other embodiments, the first tubing portion 106 may be separate from an exhaust ventilation system. For example, the first tubing portion 106 may be separate if the fermentation facility 102 has a general exhaust ventilation system or no exhaust ventilation system. In such embodiments, a first end of the first tubing portion 106 may be connected directly to the fermentation airlock 202 to receive the carbon dioxide by-product 140 released via the fermentation airlock 202.

Once the carbon dioxide by-product 140 is released from the fermentation airlock 202 and is received by the first end of the first tubing portion 106 either directly or via the ventilation header 210, the carbon dioxide by-product 140 may continue to flow throughout the first tubing portion 106 until a second end of the first tubing portion 106 is reached. The second end of the first tubing portion 106 may be connected to the valve 108. The valve 108 may control a directional flow of the carbon dioxide by-product 140 by either directing the carbon dioxide by-product 140 through the second tubing portion 110 to the greenhouse 112 or diverting the carbon dioxide by-product 140 through the third tubing portion 118 to the external environment 120, as discussed in further detail below with respect to FIGS. 4-6.

In some embodiments, an entirety of the first tubing portion 106 and the valve 108 may be located internally within the fermentation facility 102, along with portions of the second tubing portion 110 and the third tubing portion 118. Alternatively, the valve 108 may be located on an exterior surface of the fermentation facility 102 such that the entirety of the first tubing portion 106 is housed within the fermentation facility 102, but the second tubing portion 110 and third tubing portion 118 remain entirely external to the fermentation facility 102.

Figure 3:
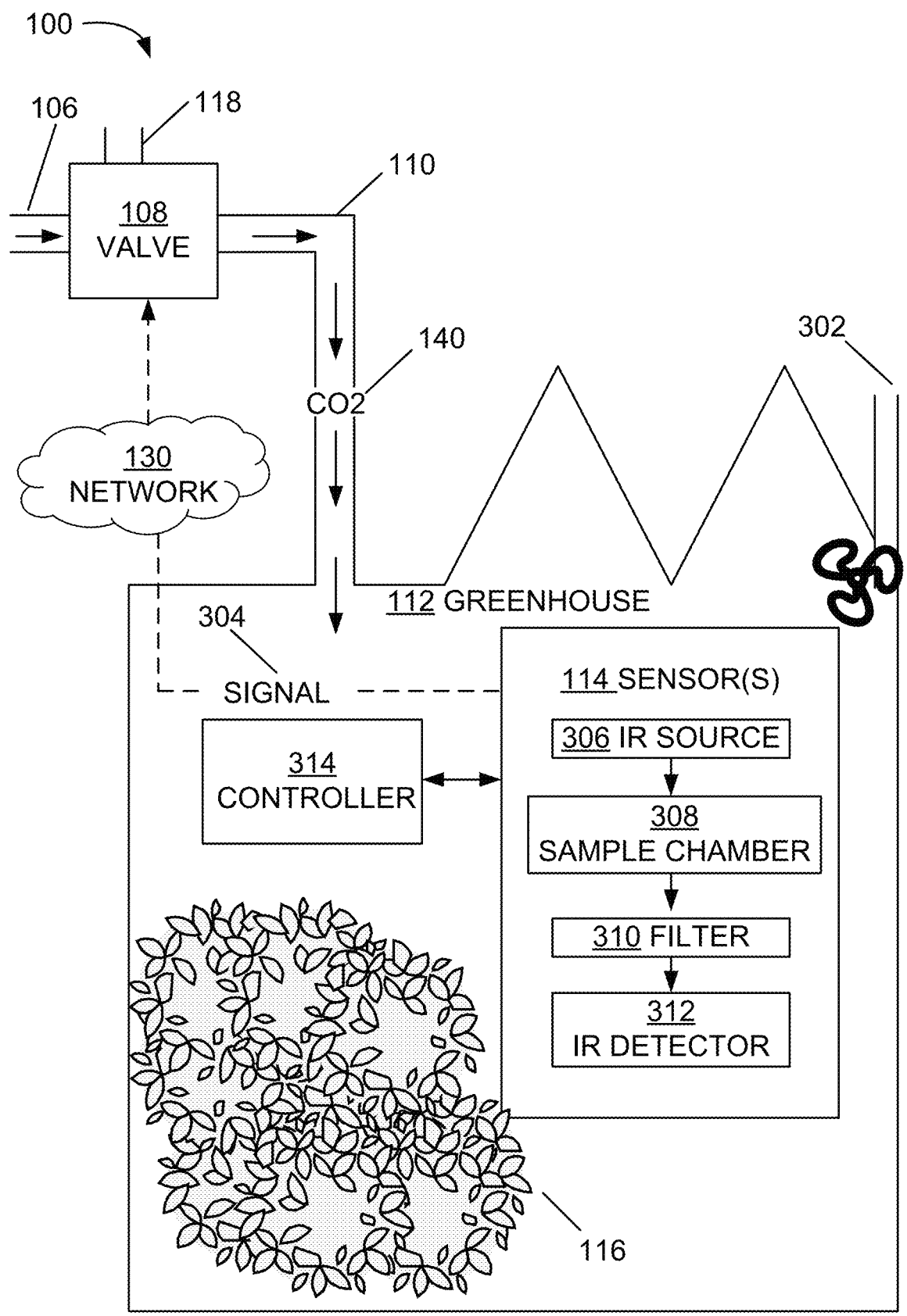
FIG. 3 illustrates an example greenhouse associated with a system for directly transferring fermentation carbon dioxide by-product to a greenhouse.

FIG. 3 illustrates an example greenhouse 112 associated with a system 100 for directly transferring fermentation carbon dioxide by-product 140 to a greenhouse 112. The greenhouse 112 may be an enclosed structure made primarily with transparent material, such as glass or plastics, to allow sunlight to enter in which plants, such as the plants 116, are grown in a climate controlled environment. The greenhouse may also include exhaust system 302 to move and refresh air within the greenhouse 112, as well as let other gases escape to promote both plant growth and worker safety, for example.

Photosynthesis is a process used by the plants 116 to convert carbon dioxide and water using light energy (e.g., energy from the sunlight) to glucose and oxygen. The glucose may be consumed or stored for later consumption by the plants 116 to drive metabolism and promote growth of the plants 116. Therefore, by increasing a concentration of carbon dioxide to optimal levels in the greenhouse 112, photosynthetic efficiencies may be improved generating greater amounts of glucose, which in turn results in higher quality and/or higher yielding plants. Optimal carbon dioxide concentration ranges may be from 1,000 parts per million (ppm) to 1,400 ppm depending on plant type, for example.

Traditionally, to increase a concentration of carbon dioxide within greenhouses, tanks of pressurized carbon dioxide or other similar sources of carbon dioxide with valve-like controls to ensure release of the carbon dioxide at a frequency and amount to maintain optimal levels within the greenhouses, for example, would be purchased from various suppliers. Some of the suppliers may include fermentation facilities that install carbon dioxide capture systems to collect and package fermentation carbon dioxide by-product, and ship to the greenhouses, as discussed above with respect to FIG. 2. However, the costs of capturing and packaging carbon dioxide passed along to the greenhouses, as well as transportation costs to ship the carbon dioxide can become quite high, and economically impractical for greenhouses.

System 100 removes these re-capture, packaging, and transportation costs and inefficiencies by enabling direct transfer of fermentation carbon dioxide by-product (e.g., the carbon dioxide by-product 140) from the fermentation facility 102 to the greenhouse 112 to maintain optimal concentration levels of carbon dioxide by-product 140 within the greenhouse 112. For example, based on a signal 304 transmitted by the one or more sensors 114 located in the greenhouse 112, the carbon dioxide by-product 140 received at the valve 108 via the first tubing portion 106 from the fermentation facility 102 may then be directed to the greenhouse 112 via the second tubing portion 110. As described in further detail below, the signal 304 transmitted by the sensors 114 may indicate that the carbon dioxide concentration level within the greenhouse 112 is below a predetermined threshold.

The sensors 114 may be configured to real-time monitor carbon dioxide concentration levels in the greenhouse 112. A number of sensors 114 may be dependent on a size or structure of a greenhouse 112, as well as based on a number and types of plants 116 within the greenhouse 112. In some examples, the sensors 114 may be preset to detect a particular range of carbon dioxide concentration levels. For example, the preset range of detection may be carbon dioxide concentration levels from 500 ppm to 1500 ppm. In other examples, the sensors 114 may be customizable and have an adjustable range. Sensors 114 with adjustable ranges of detection may be particularly useful if the greenhouse rotates between different types of plants with varying optimal levels of carbon dioxide concentrations.

In some embodiments, the sensors 114 may be near non-dispersive infrared (NDIR) sensors comprising an infrared (IR) source 306, a sample chamber 308, one or more filters 310 and an IR detector 312. For example, the sample chamber 308 may comprise a sample of the current gaseous environment within the greenhouse 112. To determine the carbon dioxide concentration level within the current gaseous environment, the IR source 306 may direct IR light through the sample chamber 308 towards the IR detector 312. Parallel to the sample chamber 308, there may be a reference chamber with an enclosed reference gas. In some examples, the reference gas may be nitrogen. The gases within the sample chamber 308 may cause absorption of specific wavelengths according to the Beer-Lambert law, and the attenuation of these wavelengths may be measured by the IR detector 312 to determine the concentration of one or more of the gases. The IR detector 312 may have one or more filters, such as an optical filter, in front of the IR detector 312 (e.g., between the sample chamber 308 and the IR detector 312) that eliminates all wavelengths of light except the wavelength of the light that the carbon dioxide molecules can absorb in order to specifically determine the concentration of carbon dioxide within the current gaseous environment. In other embodiments, and as understood by one skilled in the art, alternative types of sensors may be used to determine the carbon dioxide concentration levels.

In some examples, the sensors 114 may be an integral component of a computing device (e.g., a controller 314). In other examples, the sensors 114 may be separate from but communicatively coupled to the controller 314. In either example scenario, the controller 314 may receive the carbon dioxide concentration level from the sensors 114 and compare the received level to a predetermined threshold. The predetermined threshold may be a carbon dioxide concentration level determined to be optimal for photosynthetic efficiencies. The predetermined threshold may be selected based on a number and/or a type of the plants 116 contained within the greenhouse. To provide an example range, the selected predetermined threshold may be from about 1,000 parts ppm to 1,400 ppm corresponding to the optimal carbon dioxide concentration ranges.

If based on the comparison, the carbon dioxide concentration level is at or above the predetermined threshold, the sensors 114 may continue to monitor the concentration levels for any changes that indicate the level is below the predetermined threshold. During this time, the valve 108 may be de-energized and any carbon dioxide by-product 140 received from the fermentation facility 102 may be diverted by the valve 108 to the external environment 120 via the third tubing portion 118, as described in greater detail in FIG. 5. However, if or when the carbon dioxide concentration level is determined to be below the predetermined threshold, the controller 314 may instruct the sensors 114 to transmit the signal 304 over the network 130 to the valve 108. The signal 304 may be an electrical signal that energizes the valve 108 and causes the valve to direct the carbon dioxide by-product 140 from the fermentation facility 102 to the greenhouse 112 via the second tubing portion, as described in greater detail in FIG. 6.

In some embodiments, the controller 314 may include a proportional-integral-derivative (PID) controller. The PID controller may generate the instructions provided to the sensors 114 to ultimately manage the valve 108 and control the directional flow of the carbon dioxide by-product 140. For example, the PID controller may continuously calculate an error value as a difference between a desired setpoint and a measured process variable. In the system 100, the desired setpoint may be the predetermined threshold and the measured process variable may be the current carbon dioxide concentration level detected by the sensors 114. Based on the error value, the PID controller may apply a correction based on one or more of proportional, integral, and derivative terms, as these terms are understood by one skilled in the art. The PID controller may then generate the instructions to provide to the sensors 114 based on the correction to be applied. For example, if the error value calculated indicates the current carbon dioxide concentration level is below the predetermined threshold, the PID controller may apply a correction to raise the current carbon dioxide concentration level by instructing the sensors 114 to transmit the signal 304 to the valve 108. Upon receipt of the signal 304, the valve 108 may become energized, which effects an opening and closing of orifices of the valve 108, as described in greater detail in FIGS. 5 and 6, and causes the carbon dioxide by-product 140 to be directed into the greenhouse 112.

In additional embodiments, the PID controller may also control a strength of the signal 304 that is transmitted to the valve 108 through the instructions provided to the sensors 114. Variable signal strength may adjust a size of a flow passage created by the orifices of the valve 108, which correspondingly controls a flow rate and/or pressure of the carbon dioxide by-product 140 directed from the fermentation facility 102 to the greenhouse 112, for example.

The greenhouse 112 may also include other types of sensors or monitors for monitoring and/or controlling various aspects of the internal environment. For example, the greenhouse 112 may also include sensors or monitors for air temperature and humidity regulation.

The greenhouse 112 may at least partially house the second tubing portion 110 such that the carbon dioxide by-product 140 is directly transferred into the greenhouse 112 via the second tubing portion 110. In some embodiments, an entirety of the second tubing portion 110 and the valve 108 may be located internally within the greenhouse 112, along with portions of the first tubing portion 106 and the third tubing portion 118. Alternatively, the valve 108 may be located on an exterior surface of the greenhouse 112 such that the entirety of the second tubing portion 110 is housed within the greenhouse 112, but the first tubing portion 106 and third tubing portion 118 remain entirely external to the greenhouse 112.

FIG. 4 illustrates example state configurations 400A and 400B of a three-way solenoid valve 402. In some embodiments, valve 108 of example system 100 that controls a directional flow of carbon dioxide by-product 140 received from the fermentation facility 102 to one of the greenhouse 112 or the external environment 120 may be a solenoid valve similar to solenoid valve 402, as described in more detail in FIGS. 5 and 6 below.

The solenoid valve 402 may comprise solenoid coils 404 on each side of a core tube 406 housing a plunger 408. The solenoid valve 402 may also comprise orifices and ports within a valve body of the solenoid valve 402, where a number of ports and orifices may be dependent on a type of the solenoid valve 402. As illustrated, the solenoid valve 402 may be a 3/2 solenoid valve comprising three ports and two orifices, one of which is always open to allow for two paths of flow. The orifices include a first orifice 410 and a second orifice 412. The three ports include an inlet port 414, an exhaust port 416, and an outlet port 418. As understood by one skilled in the art, the solenoid valve 402 may comprise additional structural components, however those illustrated are emphasized for features relevant to the systems and methods described herein.

The valve body may be composed of brass, stainless steel, aluminum, or plastic, among other materials. The solenoid coils 404 may be helical coils wound around a metallic core (e.g., a spool wound with insulated copper wire) to produce a uniform magnetic field when an electric current is passed through the coils. The core tube 406 housing the plunger 408 may be non-magnetic allowing the magnetic field to be passed through from the solenoid coils 404 to the plunger 408. The plunger 408 comprises magnetic properties, and may be seated against either the first orifice 410 or the second orifice 412 based on a state of the solenoid valve 402. Specifically, the plunger 408 moves as electric current is passed through solenoid coils 404 and then returns to its previous position once the electric current is removed, causing seals at the orifices 410, 412 to be made or broken that control the movement of fluids or gases received via the inlet port 414.

For example, when the solenoid valve 402 is in a de-energized state, as shown in configuration 400A, no electric current is being received through the solenoid coils 404 and thus no magnetic field is created. As a result, the plunger 408 is seated against the second orifice 412, effectively blocking the second orifice 412 and preventing a flow of fluids or gases from the inlet port 414 to the outlet port 418. Correspondingly, when the plunger 408 is seated against the second orifice 412, the first orifice 410 is open enabling a flow of fluids or gases from the inlet port 414 to the exhaust port 416.

When the solenoid valve 402 is in an energized state, as shown in configuration 400B, electric current is being received through the solenoid coils 404 and a uniform magnetic field 420 is produced. The magnetic field 420 pulls up the plunger 408 such that the plunger 408 is seated against the first orifice 410. As a result, the first orifice 410 is effectively blocked preventing the flow of fluids or gases from the inlet port 414 to the exhaust port 416, and the second orifice 412 is now open allowing flow of fluids or gases from the inlet port 414 to the outlet port 418.

Configurations 400A and 400B are non-limiting examples of solenoid valve configurations. In other embodiments, a position of the plunger 408 in each of the de-energized and energized states of the solenoid valve 402 may be reversed. In further embodiments, other solenoid valve configurations may be possible to control the directional flow of fluids or gases.

Figure 5:
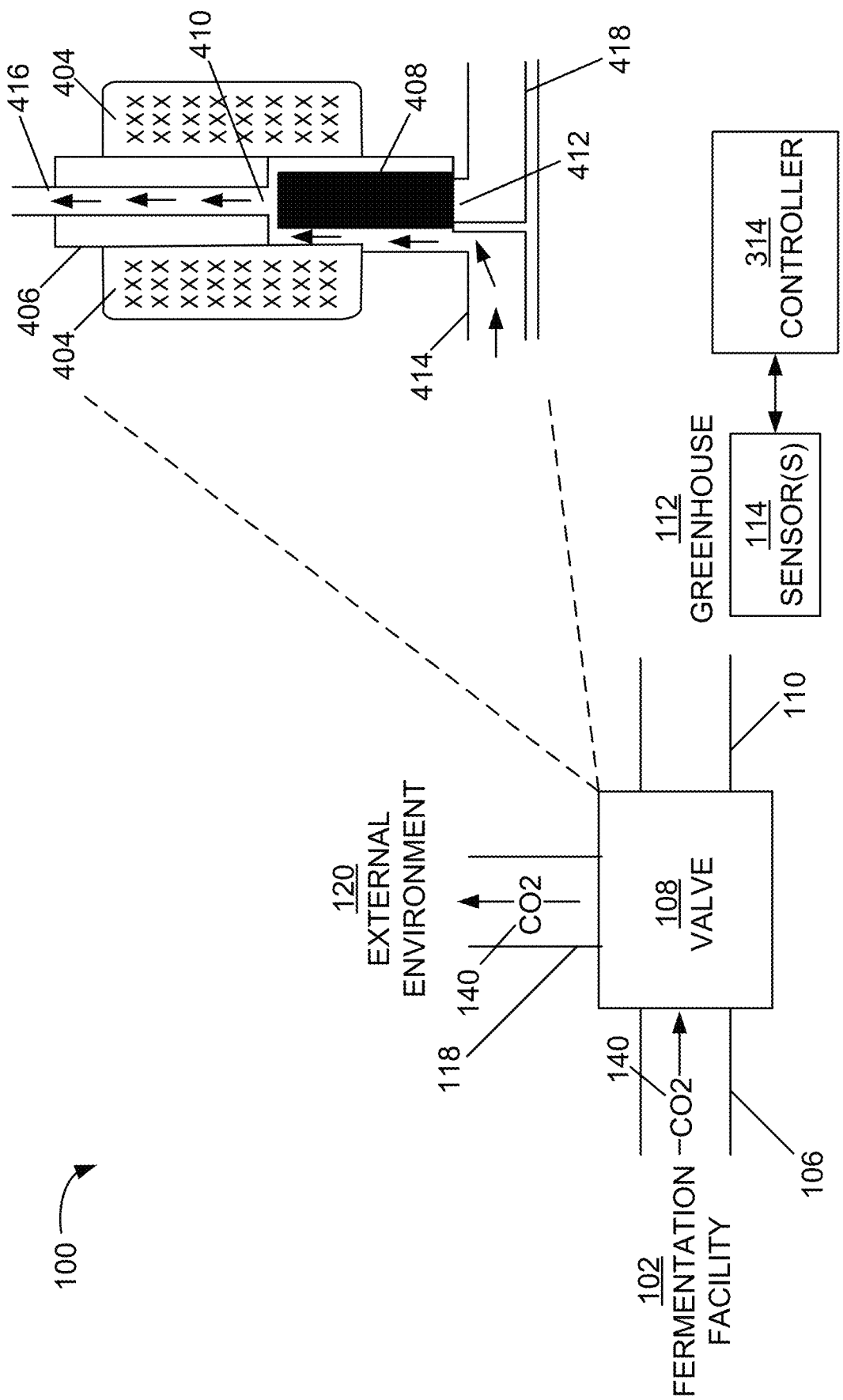
FIG. 5 illustrates an example system for directly transferring fermentation carbon dioxide by-product to a greenhouse implementing a valve as described in FIG. 4.

FIG. 5 illustrates an example system 100 for directly transferring fermentation carbon dioxide by-product 140 to a greenhouse 112 implementing a valve 108 as described in FIG. 4. For example, the valve 108 may be a solenoid valve similar to solenoid valve 402 and comprise an inlet port 414, an exhaust port 416, and an outlet port 418.

As previously discussed, in some embodiments, the valve 108 may be integrated with a tubing system of the system 100 that comprises at least three portions: the first tubing portion 106, the second tubing portion 110, and the third tubing portion 118. For example, at least one end of each of the first tubing portion 106, the second tubing portion 110, and the third tubing portion 118 may be connected to one of the ports of the valve 108. Specifically, the inlet port 414 of the valve 108 may be connected to the first tubing portion 106 to receive carbon dioxide by-product 140 from the fermentation facility 102, the outlet port 418 may be connected to the second tubing portion 110 to direct the carbon dioxide by-product 140 to the greenhouse 112, and the exhaust port 416 may be connected to the third tubing portion 118 to divert the carbon dioxide by-product 140 to the external environment 120. The valve 108 may be located within the fermentation facility 102, the greenhouse 112, or external to either the fermentation facility 102 or the greenhouse 112.

A size of the various portions of the tubing system and a size of the valve 108 implemented within the system 100 may be variable based on a desired flow rate of the carbon dioxide by-product 140, which may further be dependent on an amount of carbon dioxide by-product 140 produced. For example, in a facility with a lesser number of fermentation vessels, and where fermentation may be occurring only one to a few times a week, smaller sized portions of tubing and a smaller sized valve 108 may be used in comparison to a facility with a greater number of fermentation vessels, and where fermentation is occurring twenty-four hours a day, seven days a week.

Similarly, the frequency at which the carbon dioxide by-product 140 is received by the inlet port 414 of the valve 108 and subsequently directed to the greenhouse 112 or diverted to the external environment 120 via the outlet port 418 and the exhaust port 416, respectively, may be dependent on a scale of the fermentation facility. For example, in facilities where fermentation is continuously occurring, carbon dioxide by-product 140 may be continuously received at the inlet port 414, and thus is either continuously diverted via the exhaust port 416 to the external environment 120 or continuously directed via the outlet port 418 to the greenhouse 112.

Within the valve 108, one of the exhaust port 416 and the outlet port 418 may be open at a time to allow for two paths of flows. Through which of the two paths the carbon dioxide by-product 140 flows, may be dependent on a state of the valve 108. For example, the valve 108 may either be in a de-energized state as shown in FIG. 5 or in an energized state as shown and described in greater detail with respect to FIG. 6.

When the valve 108 is in the de-energized state, similar to configuration 400A in FIG. 4, no electric current is being received through the solenoid coils 404 and thus no magnetic field is created. The plunger 408 is seated against the second orifice 412, effectively blocking the second orifice 412, and the carbon dioxide by-product 140 received from the fermentation facility 102 via the first tubing portion 106 flows from the inlet port 414 through the first orifice 410 to the exhaust port 416. As a result, the carbon dioxide by-product 140 is diverted to the external environment 120 via the third portion of tubing connected to the exhaust port 416.

The valve 108 may be in a de-energized state because, as instructed by the controller 314, no signals are being transmitted from the sensors 114 to the valve 108. The lack of signals may indicate that the carbon dioxide concentration level in the greenhouse 112 detected by the sensors 114 is at or above a predetermined threshold based on a comparison performed by the controller 314. For example, the carbon dioxide concentration level may already be optimal for photosynthetic efficiencies based on the number and/or types of the plants 116 contained within the greenhouse 112. However, if the carbon dioxide concentration level later dips below the predetermined threshold, the controller 314 may then instruct the sensors 114 to transmit a signal to the valve 108 over a network, energizing the valve 108, as described in FIG. 6.

Figure 6:
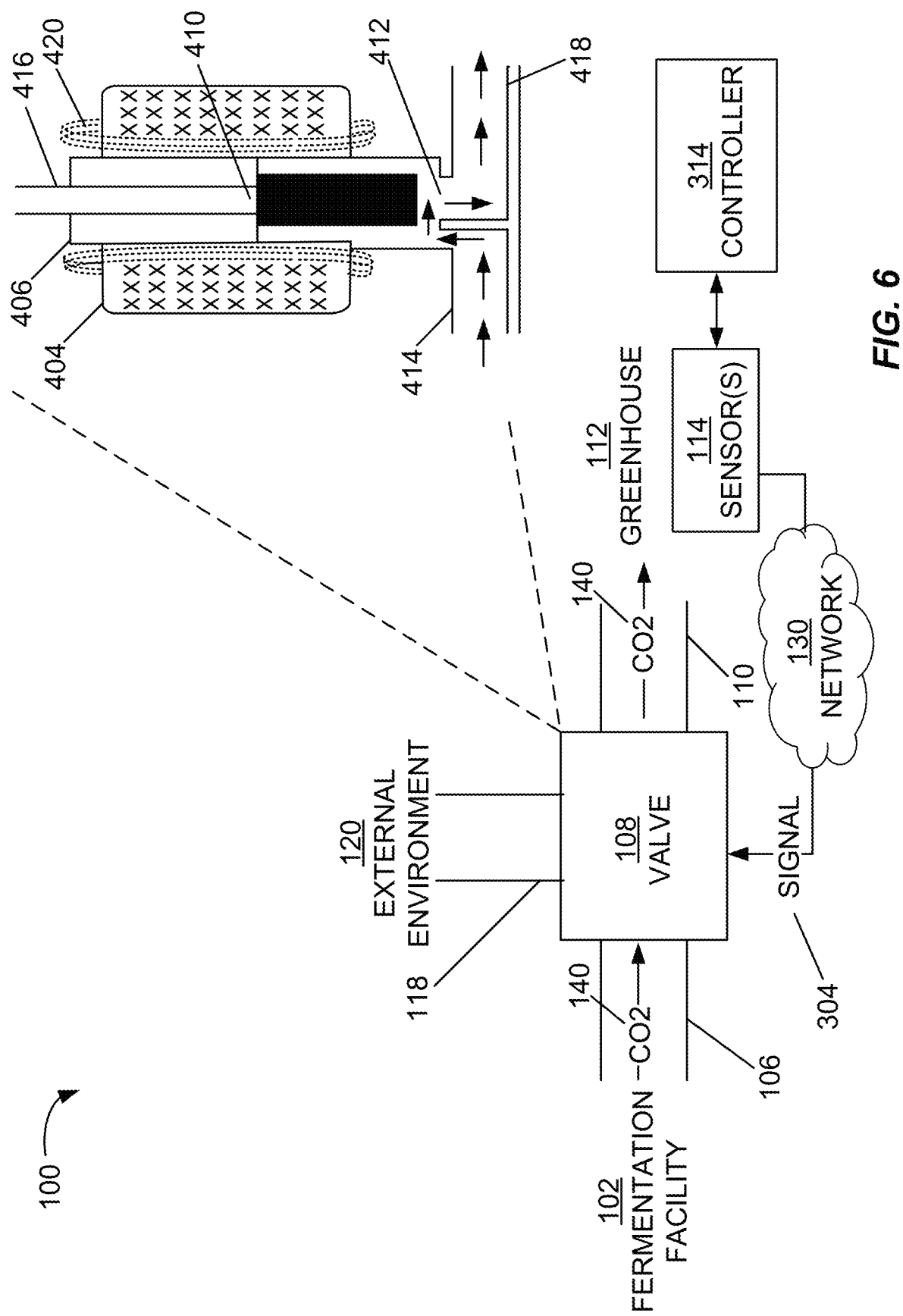
FIG. 6 illustrates an example system for directly transferring fermentation carbon dioxide by-product to a greenhouse implementing a valve as described in FIG. 4.

FIG. 6 illustrates an example system 100 for directly transferring fermentation carbon dioxide by-product 140 to a greenhouse 112 implementing a valve 108 as described in FIG. 4. For example, the valve 108 may be a solenoid valve similar to solenoid valve 402 and comprise an inlet port 414, an exhaust port 416, and an outlet port 418.

The system 100 illustrated in FIG. 6 is similar to the system 100 illustrated in FIG. 5, except the valve 108 is now in an energized state, similar to configuration 400B in FIG. 4. The controller 314 may determine that the carbon dioxide concentration level in the greenhouse 112 detected by the sensors 114 is below a predetermined threshold indicating that the concentration level is less than optimal for photosynthetic efficiencies based on the number and/or types of the plants 116 contained within the greenhouse 112. For example, the concentration level of carbon dioxide within the greenhouse 112 may be 400 ppm, whereas the predetermined threshold is 1,000 ppm.

In response, the controller 314 may instruct the sensors 114 to transmit a signal 304 to the valve 108 over the network 130 causing the valve 108 to become energized. For example, the signal 304 may provide electric current that is received through the solenoid coils 404 for production of a uniform magnetic field 420. The magnetic field 420 pulls up the plunger 408 such that the plunger 408 is seated against the first orifice 410, effectively blocking the first orifice 410 and opening the second orifice 412. The carbon dioxide by-product 140 received from the fermentation facility 102 via the first tubing portion 106 may then flow from the inlet port 414 via the second orifice 412 to the outlet port 418. As a result, the carbon dioxide by-product 140 is directed to the greenhouse 112 via the second tubing portion 110 connected to the outlet port 418.

As long as the carbon dioxide concentration level remains below the predetermined threshold in the greenhouse 112, the sensors 114 may continue to transmit the signal 304 to the valve 108 such that it remains in an energized state allowing the carbon dioxide by-product 140 to flow to the greenhouse 112. However, once the carbon dioxide concentration level is determined to be at or above the predetermined threshold, the controller 314 may instruct the sensors 114 to discontinue the transmission of the signal 304 to the valve 108, and the valve 108 will return to a de-energized state. For example, the electric current will no longer be received through the solenoid coils 404 and the magnetic field 420 will dissipate causing the plunger 408 to return to being seated against the second orifice 412. As a result, the carbon dioxide by-product 140 received from the fermentation facility 102 via the first tubing portion 106 flows from the inlet port 414 through the first orifice 410 to the exhaust port 416, and diverted to the external environment 120 via the third portion of tubing connected to the exhaust port 416. This process may be performed iteratively as the carbon dioxide concentration levels within the greenhouse 112 fluctuate.

Although FIGS. 5 and 6 describe the valve 108 as being similar to the solenoid valve 402 described in FIG. 4, other configurations of solenoid valves and/or other types and/or combinations of valves may be utilized in the system 100 to control the directional flow of the carbon dioxide by-product 140. For example, in another embodiment, a two-way solenoid valve may be positioned at each output of a T-junction, where an input of the T-junction may be connected to the first tubing portion 106 and each output may be connected to the second tubing portion 110 and the third tubing portion 118, respectively. Accordingly, one of the two-way solenoid valves may direct the carbon-dioxide by-product 140 to the greenhouse 112 via the second tubing potion 110 when open, and the other two-way solenoid valve may divert the carbon dioxide by-product 140 to the external environment 120 via the third tubing portion 118 when open. Only one of the two-way solenoid valves may be opened at a time, where similar to the solenoid valve 402 described in FIG. 4, signals generated and transmitted by the sensors 114 may control the opening and closing of the valves. In an alternative embodiment, the valve configured to divert the carbon dioxide by-product 140 to the external environment 120 may be a check valve that diverts the carbon dioxide by-product 140 based on a pressure differential created when the two-way solenoid valve configured to direct the carbon dioxide by-product 140 to the greenhouse 112 is closed.

In further embodiments, the system 100 may include a manifold comprising a plurality of valves similar to valve 108. In some examples, the manifold may facilitate transfer of carbon dioxide by-product between the fermentation facility 102 and more than one greenhouse.

The examples provided in FIGS. 1 through 6 are illustrated with specific systems, devices, applications, processes, and configurations. Embodiments are not limited to environments according to these examples. Direct transfer of fermentation carbon dioxide by-product to a greenhouse may be implemented in environments employing fewer or additional specific systems, devices, applications, processes, and configurations. Furthermore, the example specific systems, devices, applications, processes, and configurations shown in FIGS. 1 through 4 may be implemented in a similar manner with other values using the principles described herein.

Figure 7:
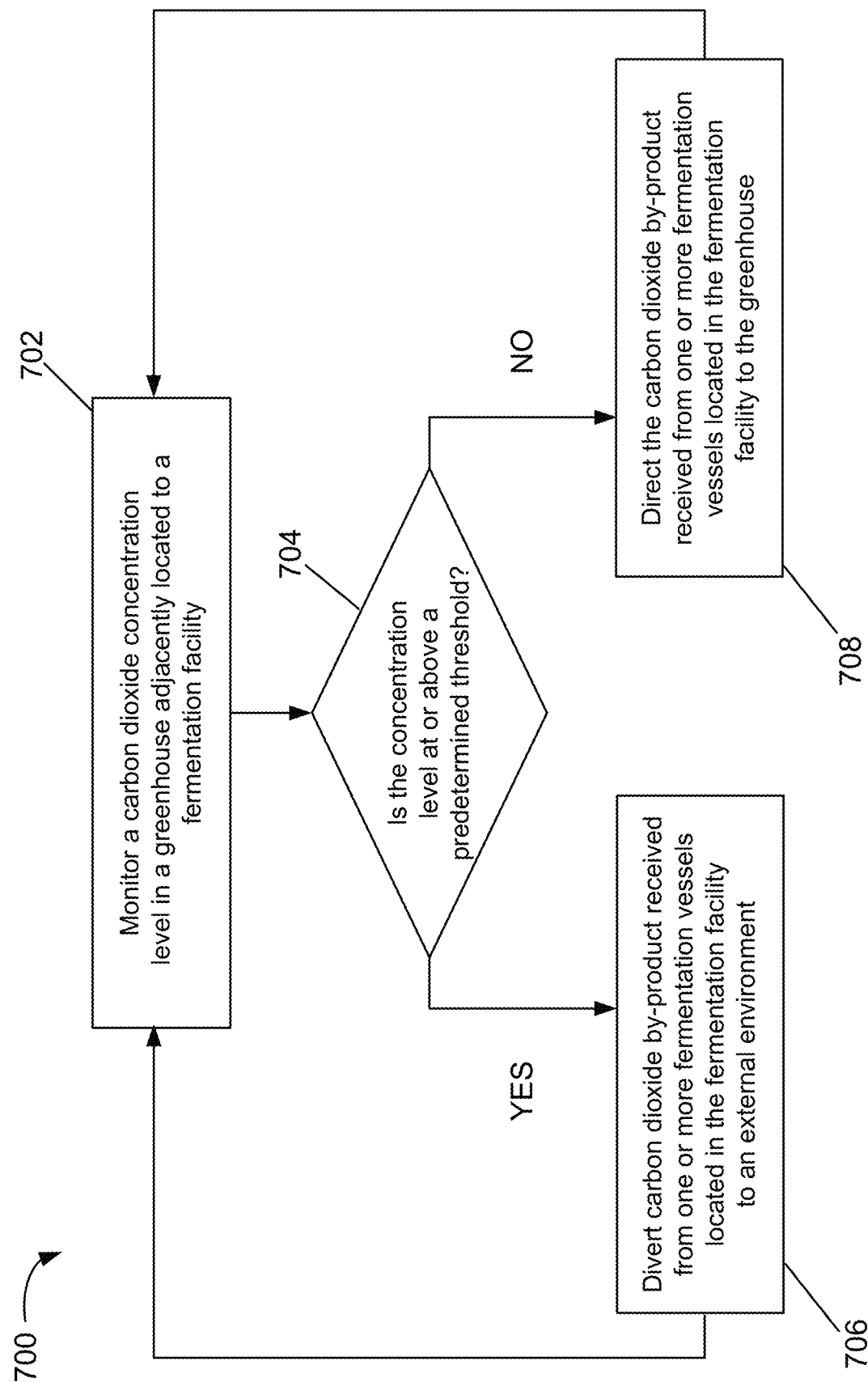
FIG. 7 illustrates an example method for controlling transfer of fermentation carbon dioxide by-product to a greenhouse.

FIG. 7 illustrates an example method 700 for controlling transfer of fermentation carbon dioxide by-product 140 to a greenhouse 112. The method 700 may be implemented within a system, such as system 100 comprising a fermentation facility 102 and a greenhouse 112 connected via a tubing system and a valve 108. For example, one or more fermentation vessels 104 located in the fermentation facility 102 may produce and release carbon dioxide by-product 140. The carbon dioxide by-product 140 may be received via a first tubing portion 106 of the tubing system that is directly or indirectly connected to the fermentation vessels 104. In some embodiments, the first tubing portion 106 may be integrated with an exhaust ventilation system 208 of the fermentation facility 102 designed to receive the carbon dioxide by-product 140 from the fermentation vessels 104 as it is released from fermentation airlocks 202. In other embodiments, the first tubing portion 106 may be directly connected to the fermentation airlocks 202 to receive the carbon dioxide by-product 140. The first tubing portion 106 may further be connected to an inlet port 414 of the valve 108 configured to receive the carbon dioxide by-product 140. As the valve 108 is receiving the carbon dioxide by-product 140, operations and decisions 702 through 708 may be performed by a controller 314.

At operation 702, a carbon dioxide concentration level in the greenhouse 112 may be monitored. For example, one or more sensors 114 communicatively coupled to and/or integrated with the controller 314 may be located within the greenhouse 112 to detect the carbon dioxide concentration level in the greenhouse 112 in real-time. At decision 704, a comparison between the carbon dioxide concentration level and a predetermined threshold may be made to determine whether the carbon dioxide concentration level is at or above the predetermined threshold. The predetermined threshold may be a carbon dioxide concentration level determined to be optimal for photosynthetic efficiencies based on a number and/or type of the plants 116 contained within the greenhouse 112. To provide an example range, the predetermined threshold may be from about 1,000 parts ppm to 1,400 ppm.

If the concentration level is at or above the predetermined threshold, at operation 706, the carbon dioxide by-product may be diverted to an external environment 120. For example, at the instruction of the controller 314, no signals may be sent from the sensors 114 to the valve 108, and the valve 108 may remain in a de-energized state causing the carbon dioxide by-product 140 to flow from the inlet port 414 to an exhaust port 416 via a first orifice 410 connecting the two ports. The exhaust port 416 may be connected to the third tubing portion 118 diverting the carbon dioxide by-product 140 to the external environment 120. The method 700 may then proceed to repeat operation 702 and decision 704. The valve 108 may remain in a de-energized state as long as the carbon dioxide concentration level is at or above the predetermined threshold.

If the carbon dioxide concentration level is below the predetermined threshold, at operation 708, the carbon dioxide by-product may be directed to the greenhouse 112. For example, the controller 314 may instruct the sensors 114 to transmit a signal 304 to the valve 108, and the valve 108 may enter an energized state utilizing the electric energy from the signal 304 to generate a magnetic field that causes the first orifice 410 to be blocked and a second orifice 412 to open that connects the inlet port 414 to the outlet port 418. As a result, the carbon dioxide by-product 140 may now flow from the inlet port 414 to an outlet port 418 via the second orifice 412, where the outlet port 418 may be connected to the second tubing portion 110 directing the carbon dioxide by-product 140 to the greenhouse 212. The method 700 may then proceed to repeat operation 702 and decision 704. The sensors 114 may continue to transmit the signal 304 and the valve 108 may remain in an energized state as long as the carbon dioxide concentration level is below the predetermined threshold. Operations and decisions 702, 704, and either 706 and 708 may be performed iteratively.

The operations and decisions 702, 704, 706, and 708 are included for illustration purposes. Controlling transfer of fermentation carbon dioxide by-product 140 to a greenhouse 112 may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 8:
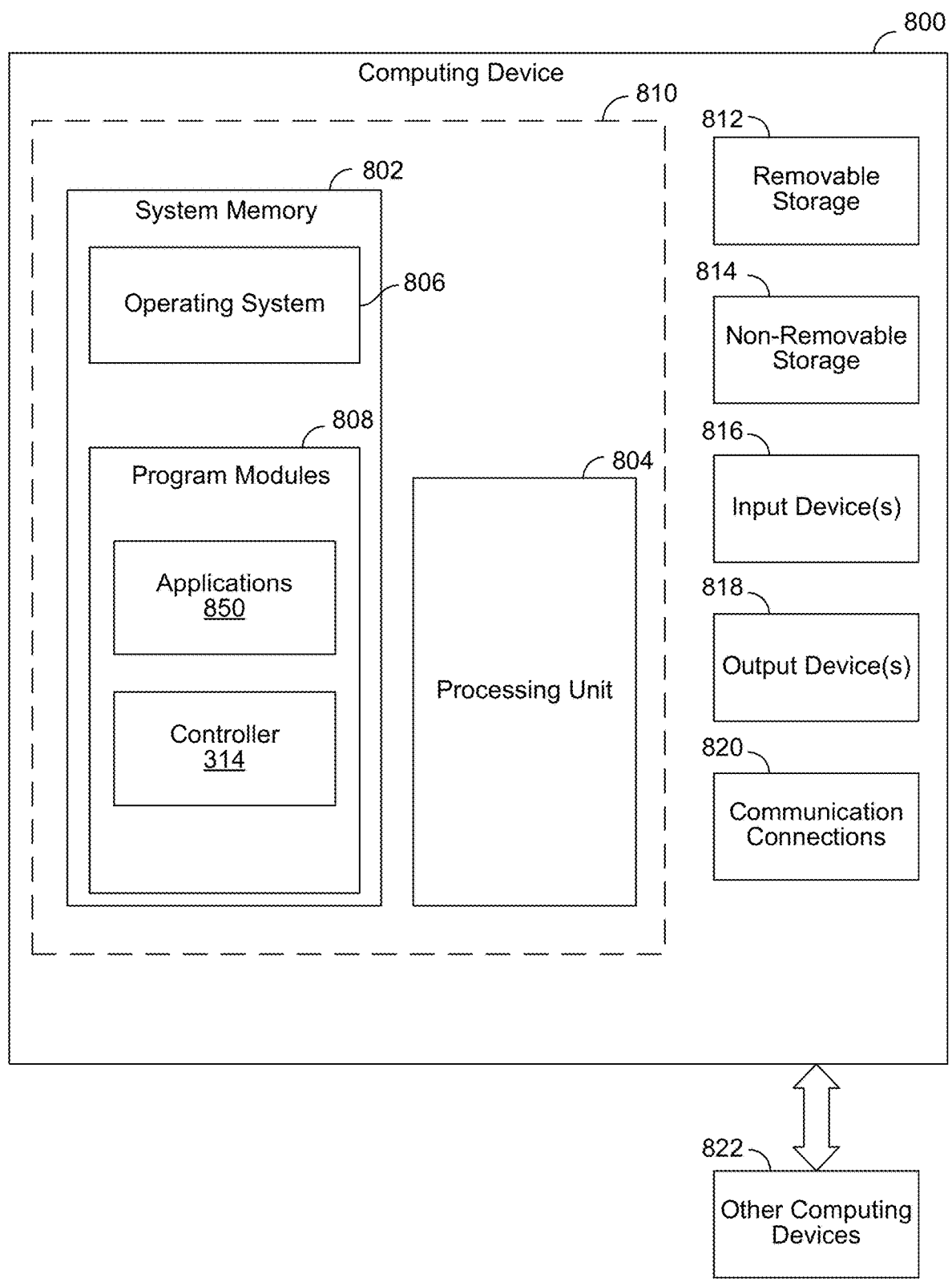
FIG. 8 illustrates an example block diagram of a computing system.

FIG. 8 illustrates an example block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 806 and one or more program modules 808 suitable for running software applications 850. According to an aspect, the system memory 804 includes a controller 314, operable to enable software applications 850 to employ the teachings of the present disclosure via stored instructions. The operating system 806, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 810. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 812 and a non-removable storage device 814.

As stated above, according to an aspect, a number of program modules and data files are stored in the system memory 804. While executing on the processing unit 802, the program modules 808 (e.g., controller 314) perform processes including, but not limited to, one or more of the operations and decisions of the method 700 illustrated in FIG. 7.

According to an aspect, the computing device 800 has one or more input device(s) 816 such as a keyboard, a mouse, a pen, a sound input device, a touch input device, etc. The output device(s) 818 such as a display, speakers, a printer, etc. are also included according to an aspect. The aforementioned devices are examples and others may be used. According to an aspect, the computing device 800 includes one or more communication connections 820 allowing communications with other computing devices 822. Examples of suitable communication connections 820 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 802, the removable storage device 812, and the non-removable storage device 814 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method for controlling transfer of fermentation carbon dioxide by-product to a greenhouse, the method comprising:
   monitoring, via a sensor, a carbon dioxide concentration level in the greenhouse located proximate to a fermentation facility;
   comparing, via a computing device, the carbon dioxide concentration level to a predetermined threshold;
   if the carbon dioxide concentration level in the greenhouse is below the predetermined threshold, directing, via the computing device, carbon dioxide by-product received from one or more fermentation vessels located in the fermentation facility to the greenhouse; and
   if the carbon dioxide concentration level in the greenhouse is at or above the predetermined threshold, diverting, via the computing device, the carbon dioxide by-product to an external environment before reaching the greenhouse.

2. The method of claim 1, further comprising:
   selecting, via the computing device, the predetermined threshold based on one or more of a number and a type of plants in the greenhouse.

3. The method of claim 2, further comprising:
   selecting, via the computing device, the predetermined threshold in a range between about 1,000 parts per million (ppm) to about 1,400 ppm.

4. The method of claim 1, wherein if the carbon dioxide by-product is being continuously received from the one or more fermentation vessels located in the fermentation facility, the method further comprising:
   determining if the carbon dioxide concentration level in the greenhouse is below, at, or above the predetermined threshold;
   in response to determining the carbon dioxide concentration level in the greenhouse is below the predetermined threshold, continuously directing, via the computing device, the carbon dioxide by-product from the fermentation facility to the greenhouse until a determination is made that the carbon dioxide concentration level in the greenhouse is at or above the predetermined threshold; and
   in response to determining the carbon dioxide concentration level in the greenhouse is at or above the predetermined threshold, continuously diverting, via the computing device, the carbon dioxide by-product from the fermentation facility to the external environment until a determination is made that the carbon dioxide concentration level in the greenhouse is below the predetermined threshold.

5. The method of claim 1, wherein directing the carbon dioxide by-product received from the one or more fermentation vessels located in the fermentation facility to the greenhouse comprises:
   transmitting, via the sensor, a signal to a valve controlling a flow of the carbon dioxide by-product between the fermentation facility and one of the greenhouse and the external environment, wherein the signal causes the valve to enter an energized state enabling the carbon dioxide by-product to flow from the fermentation facility to the greenhouse.

6. The method of claim 5, wherein diverting the carbon dioxide by-product to the external environment comprises:
   discontinuing, via the sensor, the transmission of the signal to the valve, wherein the discontinuation of the transmission of the signal causes the valve to enter a de-energized state enabling the carbon dioxide by-product to flow from the fermentation facility to the external environment.

7. A computing device for controlling transfer of fermentation carbon dioxide by-product to a greenhouse, the computing device comprising:
- a processing unit; and
- a memory coupled to the processing unit and storing instructions that, when executed by the processing unit, cause the processing unit to:
  - receive, from a sensor, a carbon dioxide concentration level monitored by the sensor in the greenhouse located proximate to a fermentation facility;
  - compare the carbon dioxide concentration level to a predetermined threshold;
  - if the carbon dioxide concentration level in the greenhouse is below the predetermined threshold, direct carbon dioxide by-product received from one or more fermentation vessels located in the fermentation facility to the greenhouse; and
  - if the carbon dioxide concentration level in the greenhouse is at or above the predetermined threshold, divert the carbon dioxide by-product to an external environment before reaching the greenhouse.

8. The computing device of claim 7, wherein to direct the carbon dioxide by-product received from the one or more fermentation vessels located in the fermentation facility to the greenhouse, the processing unit is operable to:
- instruct the sensor to transmit a signal to a valve controlling a flow of the carbon dioxide by-product between the fermentation facility and one of the greenhouse and the external environment, wherein the signal causes the valve to enter an energized state enabling the carbon dioxide by-product to flow from the fermentation facility to the greenhouse.

9. The computing device of claim 8, wherein diverting the carbon dioxide by-product to the external environment, the processing unit is operable to:
- instruct the sensor to discontinue the transmission of the signal to the valve, wherein the discontinuation of the transmission of the signal causes the valve to enter a de-energized state enabling the carbon dioxide by-product to flow from the fermentation facility to the external environment.

10. A system for controlling transfer of fermentation carbon dioxide by-product to a greenhouse, the system comprising:
- a sensor; and
- a computing device including:
  - a processing unit; and
  - a memory coupled to the processing unit and storing instructions that, when executed by the processing unit, cause the processing unit to:
    - receive, from the sensor, a carbon dioxide concentration level monitored by the sensor in the greenhouse located proximate to a fermentation facility;
    - compare the carbon dioxide concentration level to a predetermined threshold;
    - if the carbon dioxide concentration level in the greenhouse is below the predetermined threshold, direct carbon dioxide by-product received from one or more fermentation vessels located in the fermentation facility to the greenhouse; and
    - if the carbon dioxide concentration level in the greenhouse is at or above the predetermined threshold, divert the carbon dioxide by-product to an external environment before reaching the greenhouse.

* * * * *